United States Patent [19]
Atkinson et al.

[11] 4,422,894
[45] Dec. 27, 1983

[54] GASKET MANUFACTURE

[75] Inventors: Alan W. Atkinson, Rochdale; Janet M. Lancaster, Dearnley, both of England

[73] Assignee: T & N Materials Research Limited, Manchester, England

[21] Appl. No.: 321,230

[22] Filed: Nov. 13, 1981

[30] Foreign Application Priority Data

Nov. 15, 1980 [GB] United Kingdom ............... 8036727
Dec. 1, 1980 [GB] United Kingdom ............... 8038419

[51] Int. Cl.³ ................. B32B 31/00; B32B 17/00; B28B 1/46
[52] U.S. Cl. ................. 156/62.2; 156/242; 156/312; 264/120; 264/517; 264/DIG. 67; 428/192; 428/408
[58] Field of Search ............. 156/312, 244.12, 276, 156/279, 280, 298, 62.2, 160, 242, 245, 383, 313, 292, 309.3; 264/120, 517, 113, 112, 123, 125, DIG. 64, 501, 502, DIG. 66, DIG. 67; 427/181, 189, 193; 428/510, 610, 194, 408, 66, 33, 113, 192, 133

[56] References Cited

U.S. PATENT DOCUMENTS 1,510,745 10/1924 Montgomery ............... 264/120
2,869,947 1/1959 Kemper ............... 264/DIG. 67
4,234,638 11/1980 Yamazoe et al. ............... 264/112
4,333,975 6/1982 Booth ............... 428/33
4,365,008 12/1982 DeCasperis et al. ............... 428/192

FOREIGN PATENT DOCUMENTS 1522172 8/1978 United Kingdom .

Primary Examiner—Edward C. Kimlin
Assistant Examiner—Louis Falasco
Attorney, Agent, or Firm—Cushman, Darby & Cushman

[57] ABSTRACT

A flat gasket incorporating a metallic reinforcement layer which is enclosed within the gasket in relation to one edge thereof is formed from relatively uncompacted, i.e. loose, expanded graphite particles by a method comprising the step of pressing such particles onto the opposed faces of said reinforcement substantially simultaneously to form compacted graphite foils in situ thereon while at the same time pressing some of said particles relative to said one edge to form a single unreinforced graphite foil portion extending from and integral with the other foils to enclose said one edge.

7 Claims, 1 Drawing Figure

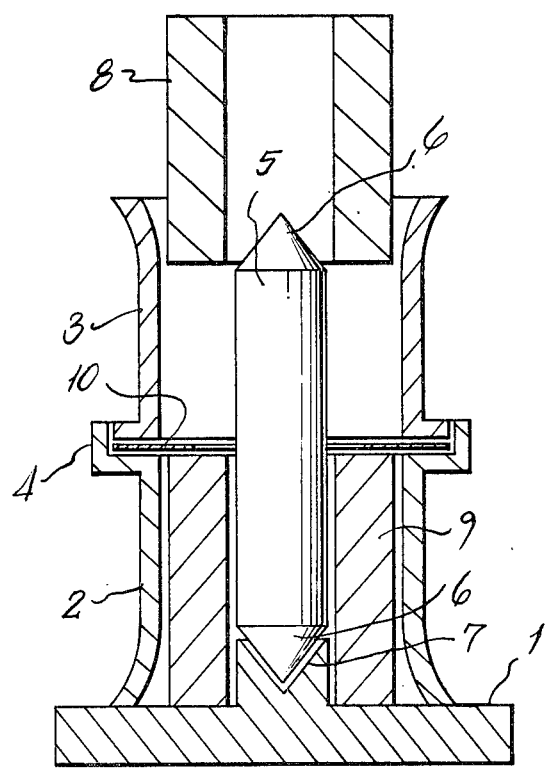

GASKET MANUFACTURE

This invention relates to the manufacture of gaskets from expanded graphite. It is particularly relevant to the manufacture of flat gaskets for petrochemical applications.

Hitherto, some such gaskets have been moulded directly from elastomeric or polymeric materials. Gaskets have also been blanked out of sheet materials, for example from papers and/or sheets of fibre-reinforced jointing materials, with or without some form of metallic core. Yet other gaskets have been made by printing settable liquid compositions onto metallic or composite substrates.

In order to obtain enhanced chemical and thermal resistance, it has been proposed to use foils or sheets made from expanded graphite, but only at considerable cost because of the high labour content and cutting waste involved in building up a complete gasket by cutting or punching, followed by laminating to attain both the desired shape and thickness. Also, graphite foil is a relatively fragile material, so that handling problem are encountered.

U.S. Pat. No. 4,333,975 proposes a solution to this problem. The specification discloses and claims a flat gasket comprising a laminate of layers of graphite foil and a metallic reinforcement layer, the graphite layers being so disposed as to overlap with and enclose the reinforcement layer within the gasket in relation to one edge thereof, said one edge being that edge of the gasket which in use may be exposed to an aggressive environment. The graphite foils are pre-formed by cutting them from expanded graphite sheet material.

Whilst the gaskets thus disclosed are commercially and technically valuable, they are expensive to make by the method described in the specification, because expanded graphite foils are expensive and cutting waste is a very significant factor. There is also the problem that the expanded graphite is compacted during manufacture of the foil and the foils themselves do not readily adhere to one another and/or to the metallic reinforcement.

In accordance with the present invention a flat graphite gasket incorporating a metallic reinforcement layer which is enclosed within the gasket in relation to one edge thereof is formed from relatively uncompacted expanded graphite particles by a method comprising the step of pressing such particles onto the opposed faces of said metallic reinforcement layer substantially simultaneously to form compacted graphite foils in situ thereon whilst at the same time pressing some of said particles relative to said one edge to form a single, unreinforced graphite foil portion extending from and integral with the other foils to enclose said one edge.

The particles are preferably pressed directly from the loose state and the method may include the step of weighing or otherwise metering a quantity of particles prior to the pressing step. It is also possible to supply the particles in the form of a self-supporting preform made by applying just enough pressure to a measured quantity of loose particles to cause sufficient cohesion thereof to permit handling. Preform densities of about 300 to 0.6 gm/liter have proved satisfactory. Normally, two such preforms would be used, one for each side of the reinforcement layer. The method would then include the step of assembling the two preforms and the metallic reinforcement layer as a stack prior to pressing to make the final product. Such a method would preferably also include the step of making the preforms.

Where loose particles are used, they may be supplied as two measured quantities, one for each side of the layer, or a single quantity may be used, overflow around the edge of the reinforcement layer being used to divide the particles into the quantities needed for the two faces of the reinforcement layer.

Expanded graphite is usually supplied in the form of vermiform particles having a bulk density of about 4 to 6 g/liter. It has been found advantageous to pre-treat these particles by milling; this breaks up the vermiform particles. It also has the effect of increasing the bulk density of the particles to about 10 to 40 g/liter. This has been found advantageous because the milled material exhibits better flow properties; it flows more readily into the corners of a mould and it requires a shallower mould for a given weight of graphite. Pre-treatment of the expanded graphite, for example by milling, to increase its bulk density is therefore a preferred step in the method of the invention.

It has been found that the method just described not only eliminates cutting waste, but also it gives a gasket in which the all-graphite portion (or portions) around the edge of the metallic reinforcement layer are essentially integral. The graphite particles coalesce together in the pressing step to give a final product which is for practical purposes non-laminated in structure. This enhances the degree of protection given to the metallic reinforcement layer. It has also been found that the particles adhere well to the reinforcement as a result of the pressing step.

However, it is also preferred that the reinforcement layer be pre-treated with a small amount of adhesive, for example, by means of an aerosol spray. This is to improve the integrity of the gasket for handling purposes. Many core materials may be used, because the graphite protects the core from direct attack by the aggressive environment.

It will be appreciated that if preforms are made from the expanded graphite particles, they can be made to the precise dimensions necessary for the final product, so there is virtually no waste. However, if previously prepared expanded graphite foils are used, as in U.S. Pat. No. 4,333,975, they have to be cut to size/shape and inevitably there is some waste. It follows that the present invention affords a considerable potential saving in cost, as well as improved technical properties.

In practice, an initial bulk density of say 4 to 40 to for typical expanded graphite particles would become a compacted density of 700 to 1500, say. "Relatively low density" and "compacted" should be interpreted in this context. (The above figures are also in gm/liter).

In order that the invention be better understood, the above method of carrying out the invention will now be particularly described by way of example with reference to the accompanying drawings in which FIG. 1 is a cross-sectional side view through a gasket mould. This mould was designed to make gaskets by the method of the invention and comprises a base 1, a cylindrical support 2, and a cylindrical upper support 3 which seats in an annular flanged portion 4 of the support 2. A solid cylindrical central spacer element 5 is provided with identical tapered portions 6 at each end. One end is located by a corresponding recess 7 in the base 1. Intermediate the two supports and the spacer 5, there are two cylindrical rams, 8 and 9 respectively. These are a sliding fit in the annular space defined between the supports 2, 3 and spacer 5. Trapped between the supports 2 and 3 at the flanged portion 4, there is a flat steel annulus 10, which is to be the metallic reinforcement layer for a gasket to be made by the method of the invention.

Assuming that the annulus 10 has already been placed in the position shown, the lower support 2 is raised (together with the upper support and also the annulus) so as to create a space between the top of the lower ram 9 and the lower face of the annulus. The upper ram is removed, temporarily, so that a measured quantity of expanded graphite particles can be poured into the mould and shaken down to at least partially fill the space just mentioned and also a corresponding volume above the annulus 10. The upper ram 8 is replaced and gently eased down towards the annulus by hand, followed by transferring the whole mould to a small platen press which is used to close both rams against the particles above and below the annulus. The press is closed until the particles are fully compacted, after which the mould parts are gently separated to release the annulus, on both sides of which the graphite particles now form compacted graphite foils. These foils overlap the radially-inward edge of the annulus and are united in an integral foil portion which extends inwardly towards the spacer 5. The diameter of the latter and the diameter of the flanged portion 4 are of course carefully selected to make a gasket for a particular size of joint, e.g. for use between a pair of confronting pipe flanges.

To further illustrate the invention a gasket was made exactly as described for use with class 600 flanges on a 50 mm nominal bore pipe line. A plain steel annulus 0.5 mm thick was used, of 110 mm outside diameter and 76 mm inside diameter. The outside diameter of the spacer 5 was 60 mm, leaving a gap of 16 mm to be filled by the integral foil portion. About 6 grams of expanded graphite particles were used in the mould and method just described. The resultant gasket was tested very successfully in a pipe joint; it withstood an internal pressure of about 34500 kN/meter$^2$ when subjected to an axial flange bolt loading of just over 24 tons. Nitrogen gas was used as the test medium.

What we claim is:

1. A method of making an annular expanded graphite gasket incorporating an annular metallic reinforcement layer which is enclosed within the annular gasket in relation to one edge thereof, the method comprising the step of pressing said gasket from relatively uncompacted expanded graphite particles onto the opposed faces of said metallic reinforcement layer substantially simultaneously between a pair of concentric rams including spacing means to define said one edge thereby forming compacted graphite foils in situ thereon, while at the same time pressing some of said particles relative to said one edge to form a single unreinforced graphite foil portion extending from and integral with the other foils to enclose said one edge.

2. A method according to claim 1 wherein the particles are pressed directly from the loose state.

3. A method according to claim 2, including a step of pre-treating the particles to increase their bulk density.

4. A method according to claim 3, wherein the particles are milled to increase their bulk density from about 4 to 6 g/liter to about 10 to 40 g/liter.

5. A method according to claim 2 wherein a single measured quantity of loose graphite particles is pressed to form the gasket.

6. A method according to claim 1 wherein the particles are supplied in the form of at least one self-supporting preform made by applying enough pressure to a measured quantity of loose particles to cause sufficient cohesion thereof to permit handling.

7. A method according to claim 1 further including the step of measuring a quantity of graphite particles for pressing.

* * * * *